United States Patent
Coyle

(10) Patent No.: US 7,163,235 B2
(45) Date of Patent: Jan. 16, 2007

(54) SEAT BELT MOUNTED AIR BAG PUNCTURE DEVICE

(76) Inventor: Jan R. Coyle, 7498 Old Highway 395, Carson City, NV (US) 89704

( * ) Notice: Subject to any disclaimer, the term of this patent is extended or adjusted under 35 U.S.C. 154(b) by 213 days.

(21) Appl. No.: 10/826,020

(22) Filed: Apr. 16, 2004

(65) Prior Publication Data
US 2005/0230944 A1    Oct. 20, 2005

(51) Int. Cl.
B60R 21/18    (2006.01)
B60R 21/239   (2006.01)
B60R 21/276   (2006.01)

(52) U.S. Cl. .................................. 280/733; 280/739
(58) Field of Classification Search ............... 280/733, 280/739, 801.1, 808, 748; 180/271
See application file for complete search history.

(56) References Cited

U.S. PATENT DOCUMENTS

| | | | |
|---|---|---|---|
| 5,097,599 A * | 3/1992 | Hasegawa | 30/359 |
| 5,542,139 A * | 8/1996 | Boivin | 7/118 |
| 5,603,526 A | 2/1997 | Buchanan | |
| 5,642,567 A * | 7/1997 | Lin | 30/366 |
| 5,657,543 A * | 8/1997 | Collins | 30/367 |
| 5,725,244 A | 3/1998 | Cundill | |
| 6,273,467 B1 | 8/2001 | Berke et al. | |
| 6,439,333 B1 | 8/2002 | Domens et al. | |
| 6,557,895 B1 | 5/2003 | Haack et al. | |
| 6,576,808 B1 | 6/2003 | Dreyer | |
| 6,640,450 B1 * | 11/2003 | Teague | 30/367 |
| 6,666,566 B1 * | 12/2003 | Uke | 362/202 |
| 2004/0050608 A1 * | 3/2004 | MacDougall | 180/271 |
| 2004/0140142 A1 * | 7/2004 | MacDougall | 180/271 |

* cited by examiner

*Primary Examiner*—Paul N. Dickson
*Assistant Examiner*—Joselynn Y. Sliteris
(74) *Attorney, Agent, or Firm*—Hogan & Hartson LLP

(57) ABSTRACT

An air bag puncture device extends from the torso of a vehicle occupant and has a pointed outer end. Upon inflation of an air bag against the torso of the occupant, the device punctures the air bag to soften the outer surface of the air bag and thereby prevent injury to the occupant. The puncture device is mounted on a resilient clip for removable mounting to the shoulder harness of a vehicle seat belt system and comprises a cylindrical cutting device having a serrated outer end opposite the resilient clip for puncturing the inflating air bag. A spring-loaded hollow cylindrical collar which normally shields the serrated outer end of the cutting device is pushed out of the way by the inflating air bag, allowing the serrated outer end of the cutting device to puncture the bag in controlled fashion.

11 Claims, 2 Drawing Sheets

SEAT BELT MOUNTED AIR BAG PUNCTURE DEVICE

BACKGROUND OF THE INVENTION

1. Area of the Art

The present invention relates to vehicle safety devices, and more particularly to a device which punctures an inflating air bag in controlled fashion so as to soften the surface of the inflating air bag and prevent injury to the vehicle occupant.

2. Description of the Prior Art

It is known in the art to provide arrangements for venting an inflating air bag to prevent injury to the vehicle occupant. Examples of such include U.S. Pat. No. 5,603,526 of Buchanan in which an air bag cushion has frangible vent coverings and vent openings which permit inflation gas to exit the cushion and provide the proper pressure reduction for preventing injury to the passenger. In U.S. Pat. No. 5,725,244 of Cundill, an air bag has a venting mechanism that allows inflation gas to vent from an inflation chamber through an expandable venting member. When the inflation pressure in the air bag reaches a preselected level, the frangible portion of the retaining member breaks and the venting member is expanded through the broken portion allowing the inflation gas to vent to the atmosphere.

Still other arrangements known in the art combine with a vehicle seat belt system to protect the vehicle occupant from injury. In U.S. Pat. No. 6,273,467 of Berke et al., a surgical shield mounted on the shoulder strap of the seat belt system prevents rubbing of the strip on a sensitive or physically impaired body area such as a heart pacer, chest injuries, or the like. U.S. Pat. No. 6,439,333 of Dömens et al. describes a sensor system for inflating an air bag in a differentiated way. The position of the vehicle occupant is determined by using the seat belt as an active reference position. The distance between the seat belt and known points within the vehicle determines the position of the seat belt and thus the vehicle occupant. U.S. Pat. No. 6,557,895 of Haack et al. describes a protective pad similar to that described in U.S. Pat. No. 6,273,467 of Berke et al. Similarly, U.S. Pat. No. 6,576,808 of Dreyer describes a protective device for a sensitive or vulnerable area of the chest of the seat belt wearer.

SUMMARY OF THE INVENTION

The present invention provides an air bag puncture device for controlled deflation of an inflating air bag. The puncture device comprises an element having at least one sharp point and an arrangement for mounting the device so that the at least one sharp point extends outwardly from the torso of a vehicle occupant and punctures an air bag upon inflation onto the torso of the occupant. The arrangement for mounting the device may include a vehicle seat belt and means for mounting the device on the seat belt. The device may include a clip for removably mounting the device on the seat belt.

The puncture device may include means for venting gas from the inflating air bag upon puncturing of the bag. The puncture device may also include apparatus for shielding the pointed tip except when the air bag inflates against the puncture device. The shielding apparatus is operative to shield the sharp point until an air bag inflates against the puncture device with a predetermined force.

In a preferred embodiment of an air bag puncture device according to the invention, a cylindrical cutting device has a serrated outer end and an opposite inner end mounted on a resilient clip for removably mounting the device on a vehicle seat belt. A spring loaded collar is slidably mounted on the cylindrical cutting device and includes a spring having a resilient resistance to sliding movement of the collar over the cutting device so as to define a predetermined amount of force exerted by an inflating air bag before the bag is punctured. Venting of gas from an inflating air bag upon puncturing of the bag is facilitated by a venting slot in the cylindrical cutting device and a vent hole in the spring loaded collar.

DETAILED DESCRIPTION OF THE INVENTION

Figure 1:
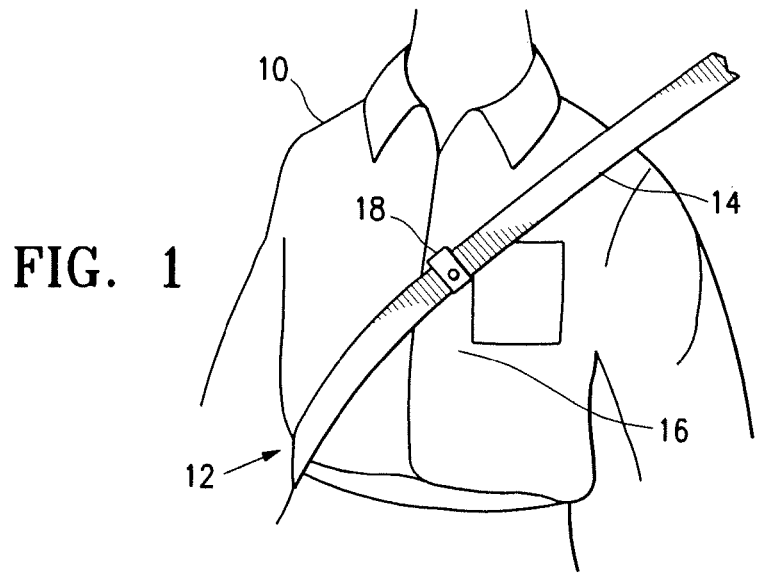
FIG. 1 is a front view of a vehicle occupant restrained by a shoulder belt having an air bag puncture device mounted thereon in accordance with the invention.

FIG. 1 is a representation of a vehicle occupant 10 wearing a seat belt system 12. Only a shoulder harness 14 of the seat belt system 12 is shown, inasmuch as that is the portion of the seat belt system 12 which extends across the torso 16 of the vehicle occupant 10. The shoulder harness 14 represents that of a driver of the vehicle, but the invention is equally applicable to passengers as well. The invention is applicable to any vehicle occupant who is protected by an air bag.

As shown in FIG. 1, an air bag puncture device 18 in accordance with the invention is mounted on the shoulder harness 14. This is a convenient way of mounting the air bag puncture device 18 so that it extends from the torso 16 of the occupant 10. As described hereafter, the air bag puncture device 18 is removably mounted on the shoulder harness 14. However, other mounting arrangements can be used, so long as the air bag puncture device 18 is mounted in the region of the torso 16 of the vehicle occupant 10 where it can engage and puncture an air bag upon inflation of the air bag into the vehicle occupant 10.

Figure 2:
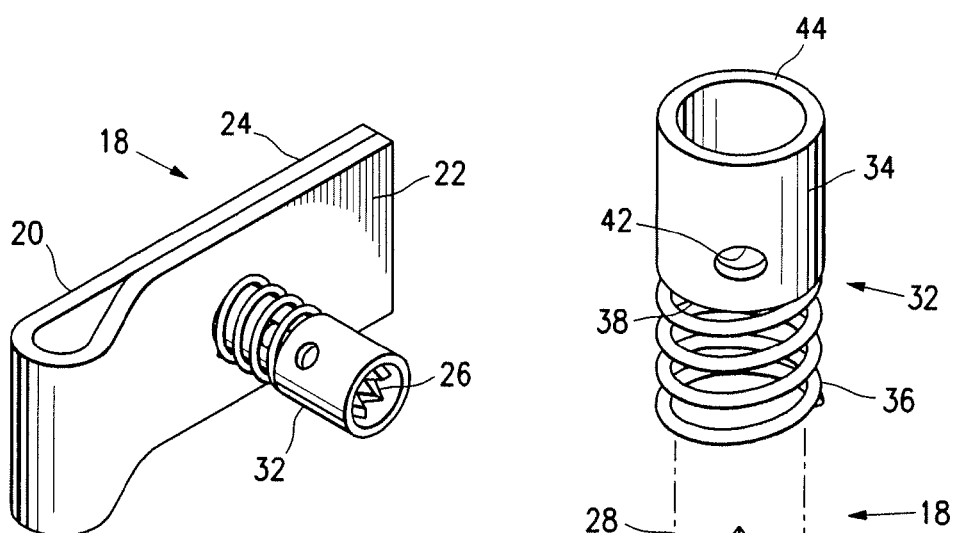
FIG. 2 is a perspective view of the air bag puncture device of FIG. 1.

As shown in FIG. 2, the air bag puncture device 18 is made removable by use of a resilient clip 20. The clip 20 has opposite facing portions 22 and 24 which are resiliently biased together. To mount the clip 20 on the shoulder harness 14, it is only necessary to separate the portions 22 and 24 against the resilient resistance of the clip 20 and slide the portions 22 and 24 over opposite sides of the shoulder harness 14. Once installed on the shoulder harness 14 in this fashion, the resilience of the clip 20 holds it in place.

Figure 3:
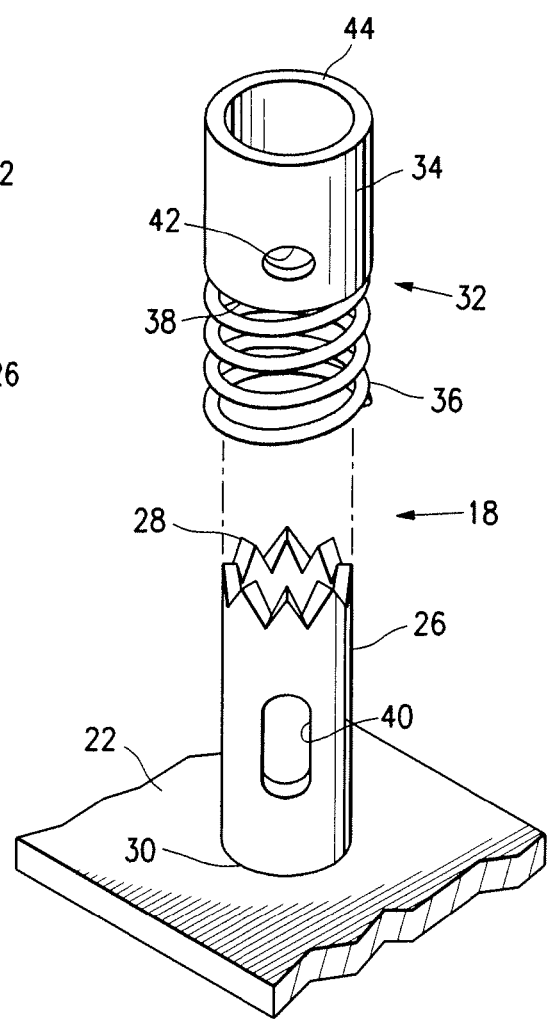
FIG. 3 is an exploded perspective view of a portion of the air bag puncture device of FIG. 2 showing a venting slot and vent hole for venting escaping gas from a punctured air bag.

The air bag puncture device 18 includes a cylindrical cutting device 26 which is best shown in FIG. 3. The cutting device 26 is of hollow cylindrical configuration and has a serrated outer end 28 which terminates in a circular array of sharp points. The cutting device 26 has an end 30 opposite the outer end 28 which is mounted on the portion 22 of the resilient clip 20.

The air bag puncture device 18 has a spring loaded collar assembly 32 which includes a hollow cylindrical collar 34 having a coil spring 36 coupled to one end thereof. The cylindrical collar 34 is mounted for sliding movement along the outside of the cutting device 26. The coil spring 36 is also disposed around the outside of the cutting device 26 and extends between an inner end 38 of the cylindrical collar 34 and the portion 22 of the clip 20.

As shown in FIG. 3, the air bag puncture device 18 has a venting arrangement for venting gas when an air bag is punctured, as described hereafter. The venting arrangement includes a venting slot 40 in a lower side of the cutting device 26, and a vent hole 42 in a lower side of the cylindrical collar 34.

Figure 4:
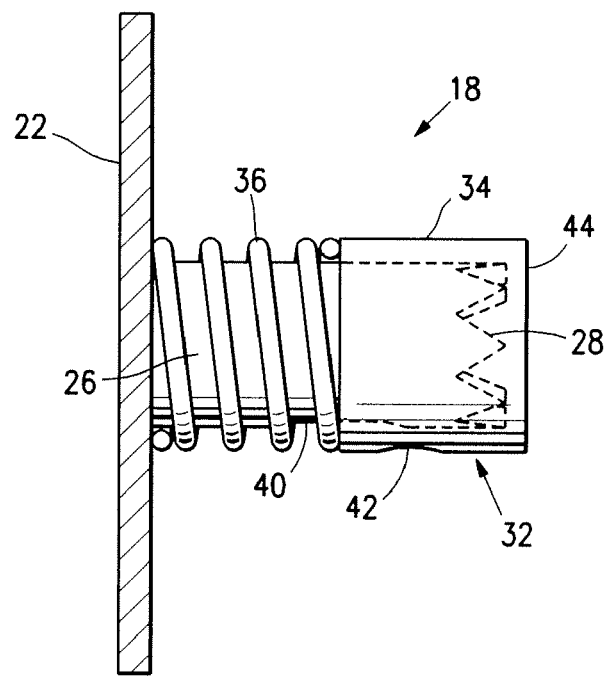
FIG. 4 is a side view of a portion of the air bag puncture device of FIG. 2 showing the manner in which a spring loaded collar normally shields a serrated outer end of a cylindrical cutting device.

FIG. 4 shows the normal orientation of the air bag puncture device 18 when an air bag has not been deployed. To shield the vehicle occupant 10 and others from the sharp points of the serrated outer end 28 of the cutting device 26, the cylindrical collar 34 extends beyond the serrated outer end 28 so that an outer end 44 thereof is outside of the serrated outer end 28.

Figure 5:
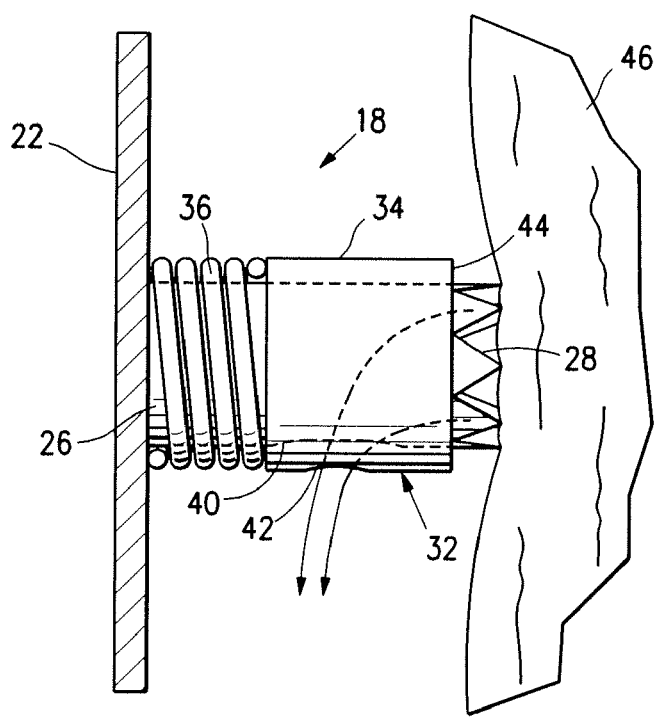
FIG. 5 is a side view similar to that of FIG. 4 but showing the manner in which an inflating air bag overcomes the resistance of the spring loaded collar so that the serrated outer end of the cutting device is able to puncture the inflating air bag.

FIG. 5 illustrates the manner in which the air bag puncture device 18 punctures an inflating air bag 46. As the air bag 46 inflates, it extends outwardly and into the region of the torso 16 of the vehicle occupant 10. It is well documented that vehicle air bags act to protect the vehicle occupants from serious injury. At the same time, however, the outer surface and other outer portions of the air bag tend to present a relatively hard outer surface of the air bag which can lead to facial and other bodily abrasions and other injuries. This occurs because the air bag inflates rapidly and with considerable force and presents a hard surface to the vehicle occupant 10 for a brief moment.

In accordance with the invention, the air bag puncture device 18 acts to puncture and partially deflate the inflating air bag 46 as it reaches the vehicle occupant 10. As a result, the outer portions of the inflating air bag 46 are greatly softened so as to minimize injury to the occupant 10. As the air bag 46 inflates, it strikes the outer end 44 of the cylindrical collar 34. Thereafter, the collar 34 slides along the cutting device 26 against the resistance of the coil spring 36. Eventually, the collar 34 reaches the position shown in FIG. 5 in which the serrated outer end 28 of the cutting device 26 protrudes beyond the outer end 44 of the collar 34 and punctures the surface of the air bag 46. When this occurs, the air bag 46 begins to deflate.

To accommodate escaping gases from the deflating air bag 46, such gases flow into the hollow interior of the cutting device 26. From there, such gases flow through the venting slot 40 of the cutting device 26 and through the vent hole 42 in the cylindrical collar 34 to the outside of the air bag puncture device 18.

The inflating air bag 46 must overcome the resistance of the coil spring 36 so that the cylindrical collar 34 is pushed back to expose the serrated outer end 28 before the air bag 46 is punctured. The force needed to overcome the resistance of the coil spring 36 is predictable and provides the air bag puncture device 18 with a predetermined force characteristic for puncturing the air bag 46. This is important to the successful operation of the air bag puncture device 18. Premature puncturing of the air bag 46 can result in a reduction in the overall effectiveness of the air bag 46. On the other hand, delayed puncturing of the air bag 46 as the result of too much force being needed to overcome the resistance of the coil spring 36 can result in the vehicle occupant 10 being struck by a hard outer surface of the air bag 46 and possibly sustaining injury. Puncturing of the air bag 46 at the right moment and by the desired amount allows the air bag 46 to maintain its overall effectiveness while at the same time softening the outer several inches of the air bag 46 so as to minimize or eliminate injury from engagement with the normally hard outer surface of the air bag 46.

It will be understood that air bag puncture devices in accordance with the invention can take on forms other than that shown and described herein while still achieving the advantages of the invention. The important consideration is that a pointed object be located at or in proximity to the torso of the vehicle occupant where the air bag comes in contact with the occupant upon deployment. Apart from that, features such as the known spring resistance and the venting effect provided by the particular embodiment of the air bag puncture device 18 disclosed herein can be employed to optimize the performance of air bag puncture devices according to the invention.

What is claimed is:

1. A seat belt system for controlled deflation of an inflating air bag comprising a belt for disposition on a vehicle occupant and a puncture device mounted on the belt and having a pointed tip for puncturing an air bag which inflates against the belt, wherein the puncture device includes means for venting gas therethrough from an inflating air bag upon puncturing of the bag.

2. A seat belt system according to claim 1, wherein the puncture device includes a clip for removably mounting the device on the belt.

3. A seat belt system for controlled deflation of an inflating air bag comprising a belt for disposition on a vehicle occupant and a puncture device mounted on the belt and having a pointed tip for puncturing an air bag which inflates against the belt, wherein the puncture device includes means for shielding the pointed tip except when an air bag inflates against the belt.

4. A seat belt system for controlled deflation of an inflating air bag comprising a belt for disposition on a vehicle occupant and a puncture device mounted on the belt and having a pointed tip for puncturing an air bag which inflates against the belt, wherein the puncture device includes means for shielding the pointed tip except when an air bag inflates against the belt, and wherein the means for shielding is operative to shield the pointed tip until an air bag inflates against the belt with a predetermined force.

5. A seat belt system according to claim 4, wherein the means for shielding includes a shielding element slidably mounted on the puncture device and a resilient element coupled to the shielding element.

6. An air bag puncture device comprising a cylindrical cutting device having a serrated outer end, a spring loaded collar slidably mounted on the cylindrical cutting device and means for mounting the cylindrical cutting device on a vehicle seat belt.

7. An air bag puncture device according to claim 6, wherein the spring loaded collar includes a spring having a resilient resistance to sliding movement of the collar over the cutting device which defines a predetermined amount of force necessary for the cutting device to puncture an inflating air bag.

8. An air bag puncture device comprising a cylindrical cutting device having a serrated outer end, a spring loaded collar slidably mounted on the cylindrical cutting device and means for mounting the cylindrical cutting device on a vehicle seat belt, wherein the cylindrical cutting device has a venting slot therein, and the spring loaded collar has a vent hole therein.

9. An air bag puncture device according to claim 6, wherein the puncture device includes means for removably mounting the cylindrical cutting device on a vehicle seat belt.

10. An air bag puncture device according to claim 9, wherein the means for removably mounting includes a resilient clip.

11. An air bag puncture device comprising a cylindrical cutting device having a serrated outer end, a spring loaded collar slidably mounted on the cylindrical cutting device and means for mounting the cylindrical cutting device on a vehicle seat belt, wherein the puncture device includes means for removably mounting the cylindrical cutting device on a vehicle seat belt, wherein the means for removably mounting includes a resilient clip, and wherein the cylindrical cutting device has an inner end opposite the serrated outer end which is mounted on the resilient clip and the spring loaded collar includes a hollow cylindrical collar slidably mounted on the cylindrical cutting device and a coil spring disposed about the outside of the cylindrical cutting device and extending between an end of the collar and the resilient clip.

\* \* \* \* \*